United States Patent
Ko et al.

(10) Patent No.: US 8,491,126 B2
(45) Date of Patent: Jul. 23, 2013

(54) PROJECTOR AND PROJECTION LENS HAVING ASSOCIATED THERMAL TRANSFER STRUCTURE

(75) Inventors: Yen-Feng Ko, Taoyuan County (TW); Tsung-Hsun Wu, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 349 days.

(21) Appl. No.: 12/834,905

(22) Filed: Jul. 13, 2010

(65) Prior Publication Data

US 2011/0025986 A1 Feb. 3, 2011

(30) Foreign Application Priority Data

Jul. 29, 2009 (TW) .............................. 98125479 A

(51) Int. Cl.
*G03B 3/00* (2006.01)
*G03B 21/14* (2006.01)
*G03B 21/16* (2006.01)
*G03B 21/18* (2006.01)
*G03B 21/26* (2006.01)
*G02B 7/02* (2006.01)

(52) U.S. Cl.
USPC ............... 353/52; 353/57; 353/100; 353/101; 359/819; 359/820; 359/822

(58) Field of Classification Search
USPC .......... 353/52, 57–58, 60, 100–101; 359/811, 359/819–820, 813, 822–823, 825–830
See application file for complete search history.

(56) References Cited

U.S. PATENT DOCUMENTS

| | | | | |
|---|---|---|---|---|
| 7,365,923 | B2 * | 4/2008 | Hargis et al. .................. | 359/820 |
| 7,926,953 | B2 * | 4/2011 | Yanagisawa et al. ........... | 353/61 |
| 8,061,849 | B2 * | 11/2011 | Hsieh et al. ..................... | 353/52 |
| 2005/0012905 | A1 * | 1/2005 | Morinaga ....................... | 353/58 |
| 2005/0213059 | A1 * | 9/2005 | Liu et al. ........................ | 353/122 |
| 2006/0285226 | A1 * | 12/2006 | Senba et al. ................... | 359/694 |

FOREIGN PATENT DOCUMENTS

| TW | 200535548 | 11/2005 |
|---|---|---|
| TW | 200727067 | 7/2007 |

* cited by examiner

*Primary Examiner* — Tony Ko
*Assistant Examiner* — Jori S Reilly-Diakun

(57) ABSTRACT

A projector includes an optical module, a lens and a heat conducting member. The heat conducting member is disposed between the optical module and the lens. The heat conducting member is used for conducting heat from the lens to the optical module.

7 Claims, 5 Drawing Sheets

PROJECTOR AND PROJECTION LENS HAVING ASSOCIATED THERMAL TRANSFER STRUCTURE

BACKGROUND OF THE INVENTION

1. Field of the Invention

The invention relates to a projector and, more particularly, to a projector in which a heat conducting member is disposed between a lens and an optical module.

2. Description of the Prior Art

Recently, projectors are getting more and more popular. With the capacity of video playing, projectors are applied not only for common office meetings, but also for various seminars or academic courses. Generally speaking, a conventional projector always has a cooling system using fans to blow outside air into a case of the projector, so as to cool heat source (e.g. lamp, optical engine and so on).

The lens of a conventional projector is divided into a front lens group and a rear lens group. During assembly, parts of the front lens group are exposed outside the case of the projector. The front lens group is connected to the optical engine. The rear lens group is disposed at the end of the front lens group and inserted into an opening of the optical engine. Since the development of the projector tends to high watt and high luminance gradually, the lens will generate more heat while operating. Generally speaking, for the sake of cost down and process simplification, the front lens group is made of plastic and the rear lens group is made of metal. Since the plastic is unfavorable for heat conduction, the rear lens group is inserted into the light engine, and there is no specific fan for cooling the lens, a focal length of the rear lens group will be affected due to thermal deflection in case of failure of timely cooling, and that will further cause thermal drift.

In order to dissipate heat from the rear lens group, there has been a body of the front lens group made of metal in the prior art to increase heat dissipation area. However, the metallic body of the front lens group not only increases cost but also still causes thermal drift for those high luminance projectors.

SUMMARY OF THE INVENTION

Therefore, an objective of the invention is to provide a projector and lens thereof. A heat conducting member is disposed between the lens and an optical module, such that the aforesaid problems can be solved.

According to an embodiment, the projector of the invention comprises an optical module, a lens and a heat conducting member. The heat conducting member is disposed between the optical module and the lens and used for conducting heat from the lens to the optical module.

According to another embodiment, the lens of the invention comprises a first lens group, a second lens group and a heat conducting member. The first lens group comprises a connecting portion. The second lens group comprises a fixing portion and a protrusion portion, wherein the fixing portion is fixed to the connecting portion and the protrusion portion protrudes from the fixing portion. The heat conducting member is disposed on the fixing portion of the second lens group. The heat conducting member is used for conducting heat generated by the second lens group.

Thus, heat generated by the lens can be conducted to the optical module by the heat conducting member and be further dissipated by a cooling system in the projector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
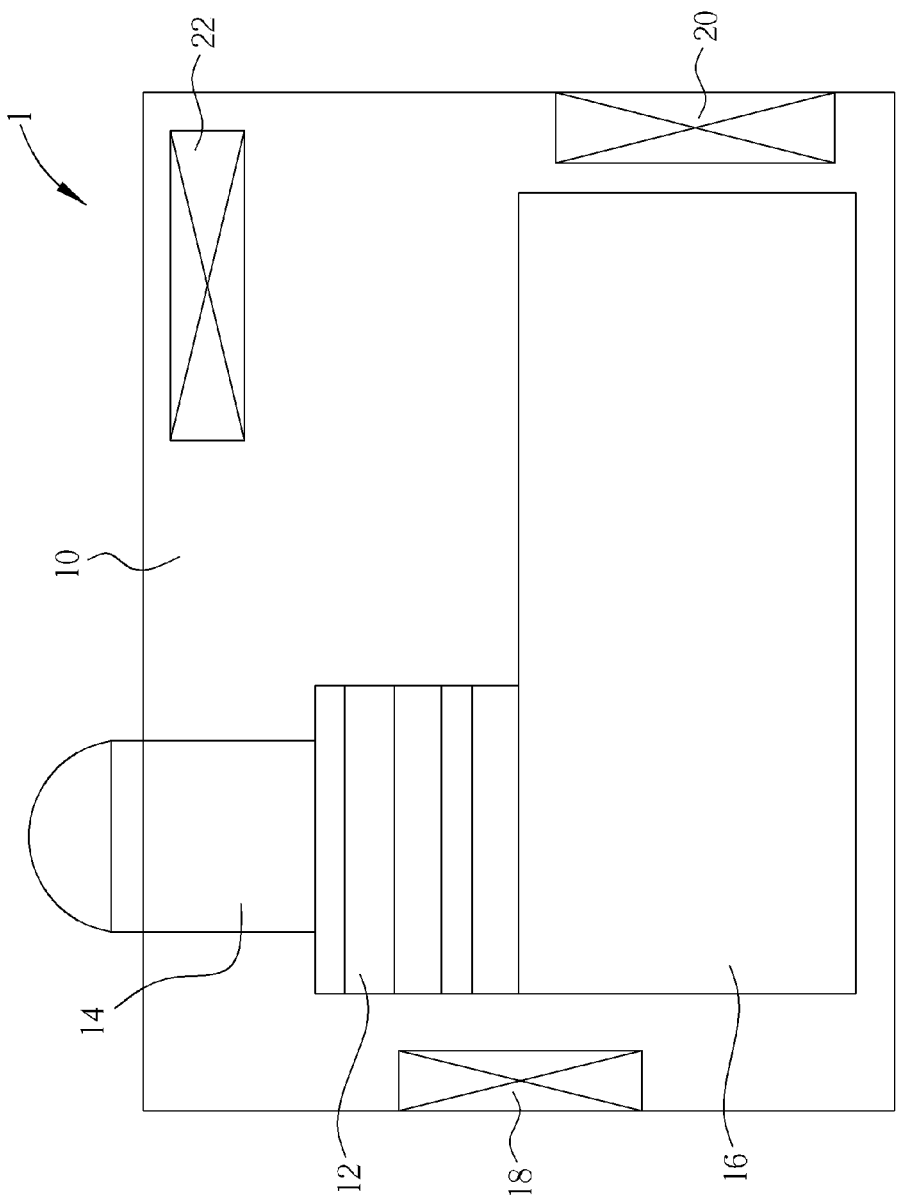
FIG. 1 is a schematic diagram illustrating a projector according to an embodiment of the present invention.

Referring to FIG. 1, FIG. 1 is a schematic diagram illustrating a projector 1 according to an embodiment of the invention. As shown in FIG. 1, the projector 1 comprises a case 10, an optical module 12, a lens 14, a light source device 16 and three fans 18, 20, 22. The light source device 16 is used for emitting light beam. The light beam is operated by the optical module 12 and then projected to form an image through the lens 14. In practical application, the optical module 12 can be a light engine, including three liquid crystal panels R, G, B as well as other necessary optical elements. Because the imaging principle of the projector 1 can be easily achieved by those skilled in the art, it will not be depicted herein. Besides, the fan 18 is used for guiding an air flow from the outside of the case 10 to the inside, and the fans 20, 22 are used for guiding the air flow from the inside of the case 10 to the outside, whereby the heat generated by the projector 1 during operation can be cooled down. As shown in FIG. 1, the fan 18 is disposed near the optical module 12 and used for cooling the optical module 12. It should be noticed that the number of the fans disposed in the case 10 of the projector 1 as well as where they are disposed are not limited to those shown in FIG. 1. It can be designed according to the practical application.

Figure 2:
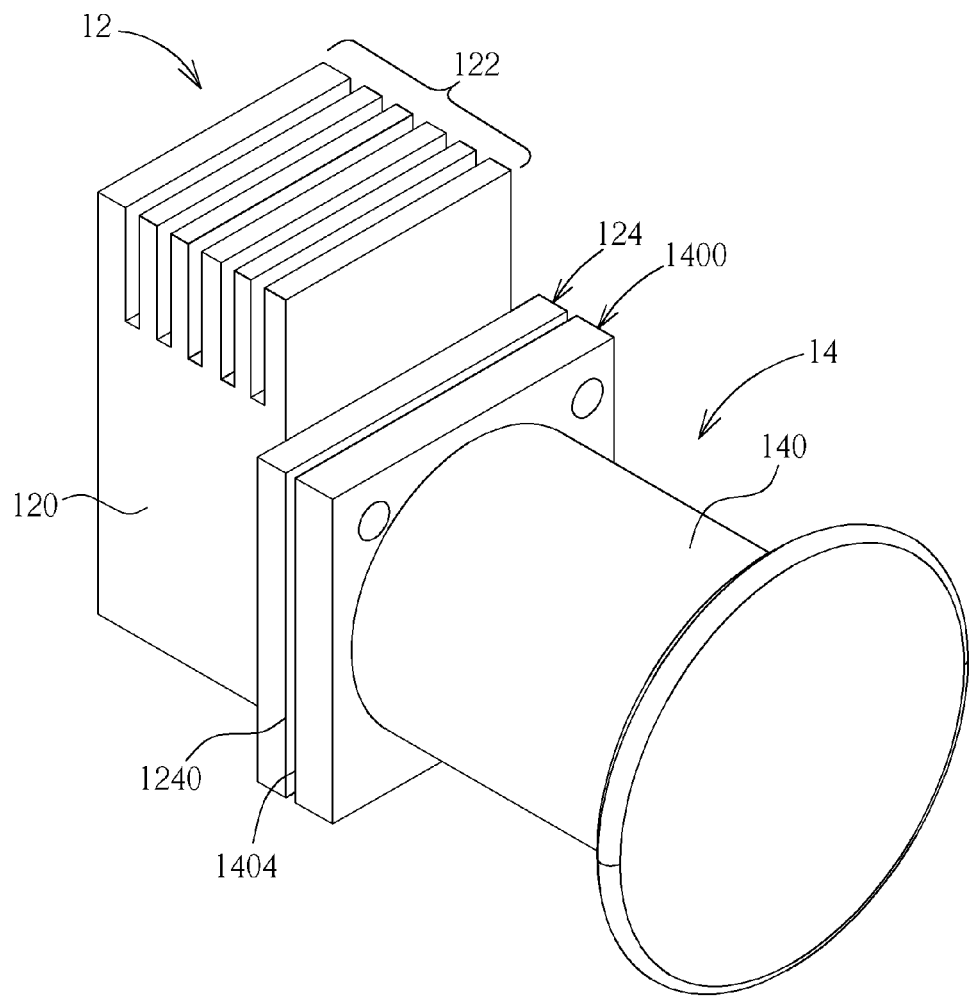
FIG. 2 is a perspective view illustrating the optical module and the lens in FIG. 1.
Figure 3:
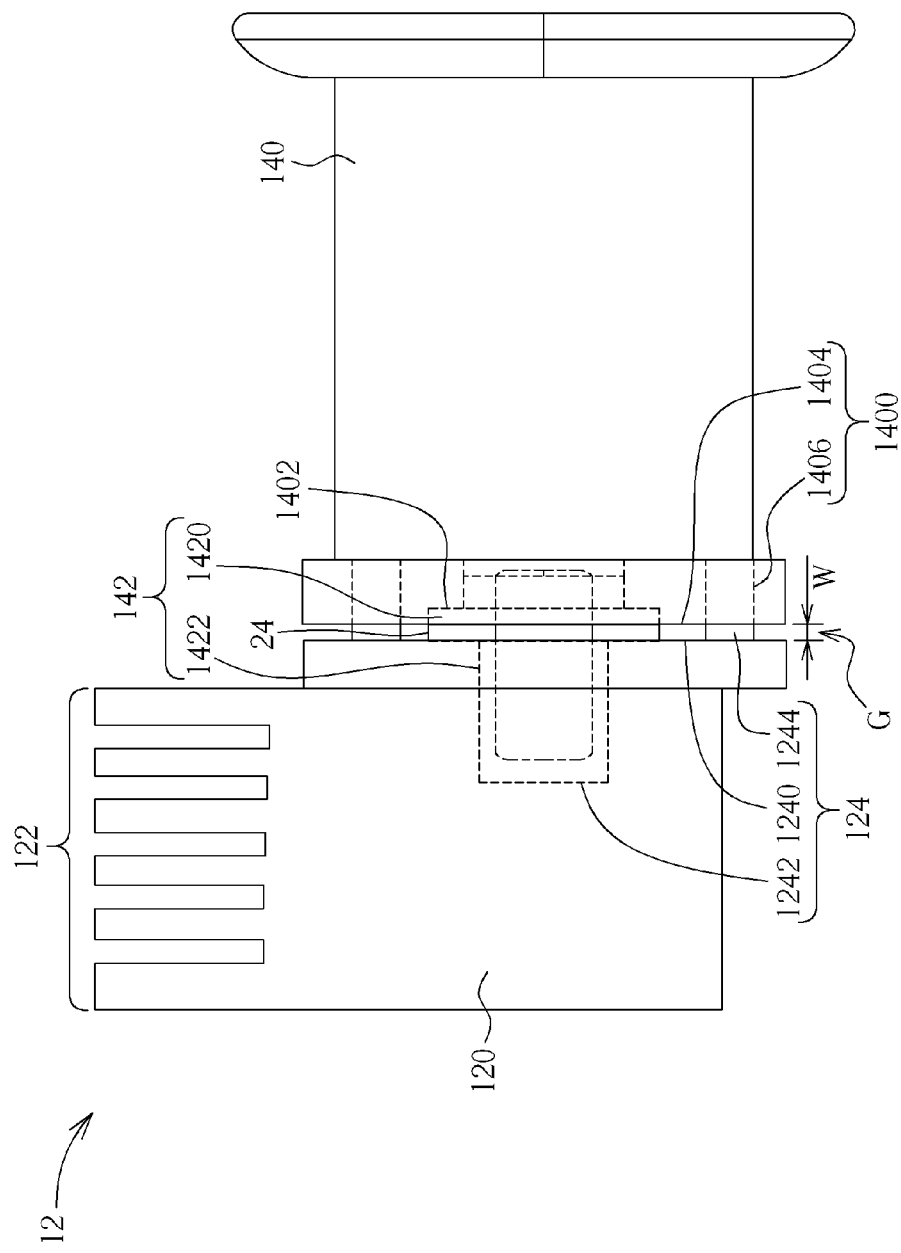
FIG. 3 is a side view illustrating the optical module and the lens in FIG. 2.
Figure 4:
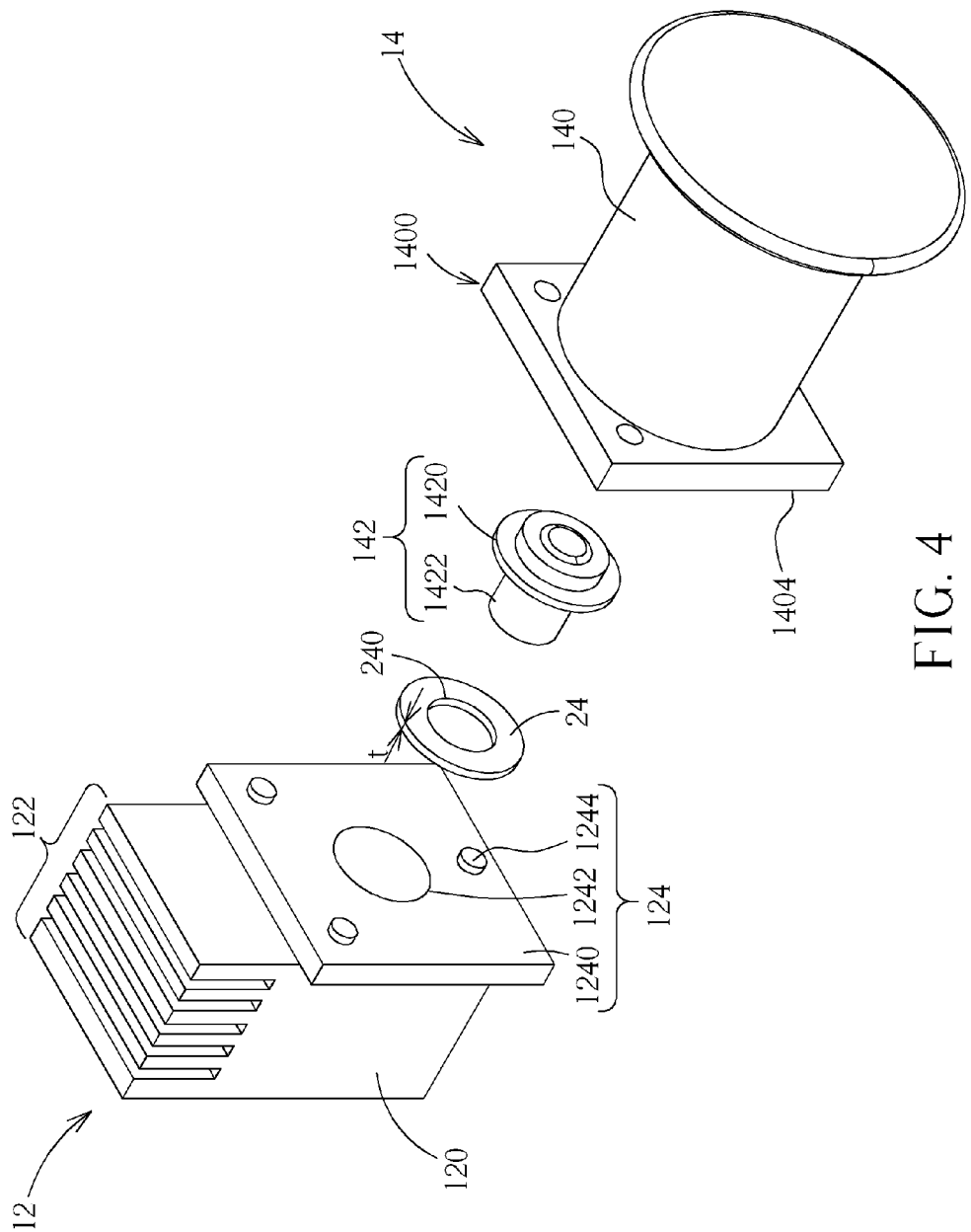
FIG. 4 is an exploded view illustrating the optical module and the lens in FIG. 2.
Figure 5:
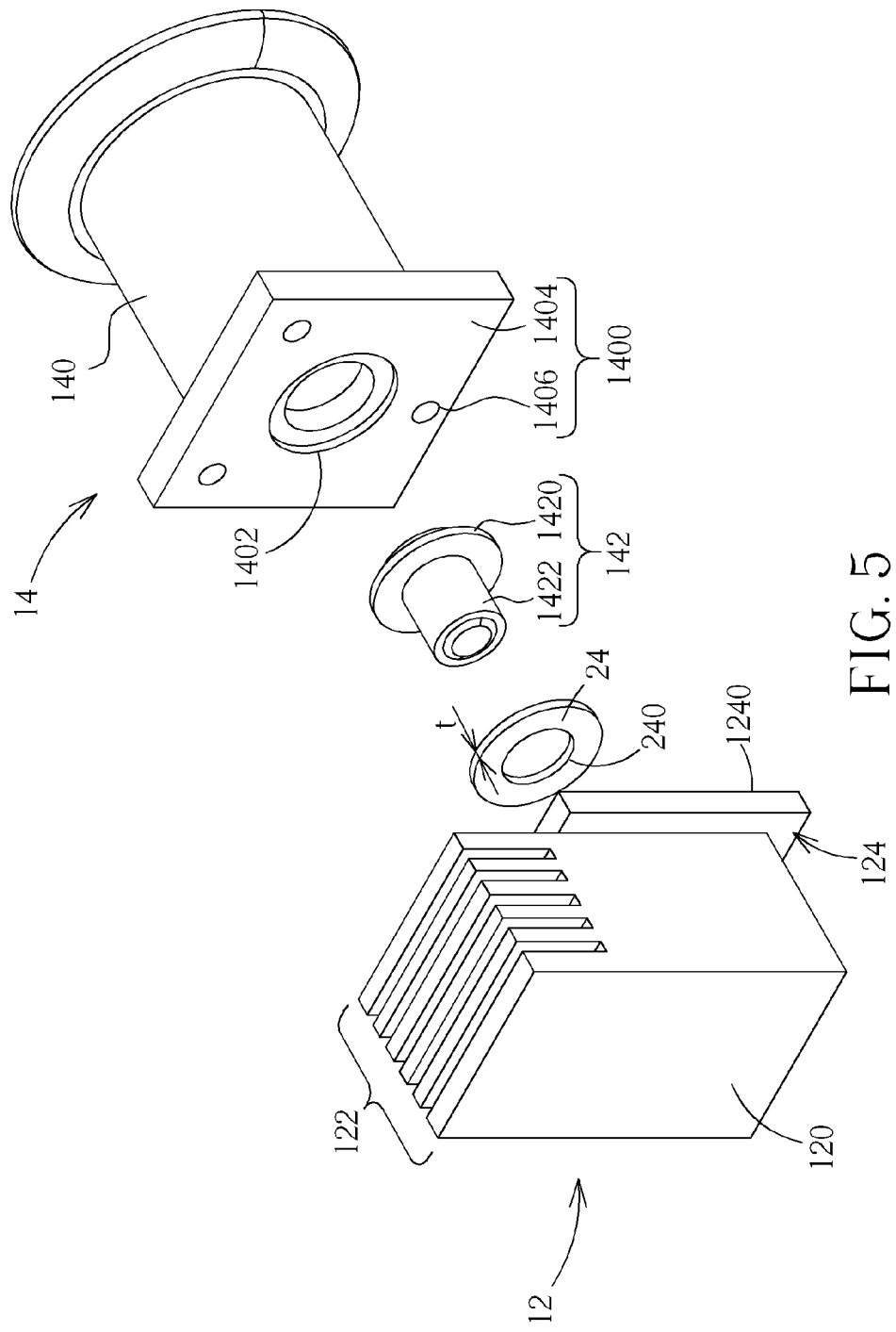
FIG. 5 is another side view illustrating the optical module and the lens in FIG. 4.

Referring to FIG. 2 to FIG. 5, FIG. 2 is a perspective view illustrating the optical module 12 and the lens 14 in FIG. 1, FIG. 3 is a side view illustrating the optical module 12 and the lens 14 in FIG. 2, FIG. 4 is an exploded view illustrating the optical module 12 and the lens 14 in FIG. 2, and FIG. 5 is another side view illustrating the optical module 12 and the lens 14 in FIG. 4. The optical module 12 comprises a body 120 and a heat sink 122. The heat sink 122 is disposed on the body 120. The heat sink 122 is used for conducting heat generated by the optical module 12, and then the heat is taken away by the air flow generated by the fans 18, 20, 22.

In this embodiment, the projector 1 further comprises a heat conducting member 24 disposed between the optical module 12 and the lens 14. The heat conducting member 24 is used for conducting heat from the lens 14 to the optical module 12. In practical application, the heat conducting member 24 can be a thermal pad. Besides, the lens 14 comprises a first lens group 140 and a second lens group 142. The second lens 142 is disposed between the first lens group 140 and the heat conducting member 24. In this embodiment, the first lens group 140 is a front lens group and the second lens group 142 is a rear lens group.

In this embodiment, the body 120 of the optical module 12 has a first connecting portion 124, wherein the first connecting portion 124 has a surface 1240, an opening 1242 and a plurality of protrusion pins 1244. The opening 1242 is formed on the surface 1240 and the protrusion pins 1244 protrude from the surface 1240. Furthermore, the first lens group 140 comprises a second connecting portion 1400 and a third connecting portion 1402. The second connecting portion 1400 comprises a surface 1404 and a plurality of holes 1406 formed on the surface 1404. The third connecting portion 1402 is a groove formed on the surface 1404. The second lens group 142 comprises a fixing portion 1420 and a protrusion portion 1422. The protrusion portion 1422 protrudes from the fixing portion 1420.

During assembly, first of all, the fixing portion 1420 of the second lens group 142 is fixed to the third portion 1402 of the first lens group 140. Then, the protrusion portion 1422 of the second lens group 142 is inserted into the holes 240 on the heat conducting member 24, such that the heat conducting member 24 is disposed on the fixing portion 1420 of the second lens group 142. Then, the holes 1406 of the second connecting portion 1400 of the first lens group 140 are connected to the protrusion pins 1244 on the first connecting portion 124 of the optical module 12 by screws (not shown). For example, each of the protrusion pins 1244 can be provided with an inner-threaded hole to which screws can be screwed. After the lens 14 is assembled with the optical module 12, the protrusion portion 1422 of the second lens group 142 is inserted into the opening 1242 of the optical module 12, and the heat conducting member 24 contacts the surface 1240 of the first connecting portion 124 of the optical module 12. Accordingly, the heat generated by the second lens group 142 can be conducted to the optical module 12 through the heat conducting member 24, and then the heat sink 122 can rapidly conduct heat from the optical module 12 to the environment. Consequently, the heat will be taken away by the air flow generated by the fans 18, 20, 22.

In another embodiment, a plurality of protrusion pins with threaded holes can be formed on the surface 1404, and a plurality of holes can be formed on the surface 1240 correspondingly, whereby the first connecting portion 124 of the optical module 12 can be fixed to the second connecting portion 1400 of the first lens group 140 by screws. Besides, the connection between the first connecting portion 124 of the optical module 12 and the second connecting portion 1400 of the first lens group 140 can be achieved by not only screws but also other connecting methods, such as rivets and so on.

As shown in FIG. 3, a gap G between the surface 1240 of the first connecting portion 124 and the surface 1404 of the second connecting portion 1400 has a width w. As shown in FIG. 4 and FIG. 5, the heat conducting member 24 has a thickness t. The thickness t of the heat conducting member 24 is preferably designed to be, but not limited to, greater than or equal to the width w of the gap G. Due to the resilience of the heat conducting member 24, the heat conducting member 24 can fully contact the surface 1240 of the first connecting portion 124 of the optical module 12 after the lens 14 is assembled to the optical module 12, whereby the heat generated by the second lens group 142 can be efficiently conducted to the optical module 12. Besides, preferably, an area of the heat conducting member 24 can be, but not limited to, greater than or equal to that of the fixing portion 1420 of the second lens group 142, so as to increase heat dissipation area.

If the body of the first lens group 140 is made of plastic and the body of the second lens group 142 is made of metal, the heat conducting member 24 can conduct the heat from the second lens group 142 to the optical module 12 efficiently. In another embodiment, the bodies of the first lens group 140 and the second lens group 142 both can be made of metal and the invention still works.

Compared to the prior art, there is a heat conducting member disposed between the lens and the optical module such that the heat generated by the lens (especially for the second lens group, i.e. the rear lens group) can be conducted to the optical module by the heat conducting member. Accordingly, the heat can be dissipated rapidly by the cooling system in the projector. According to practical measurement, the heat conducting member disposed between the lens and the optical module can significantly result in lowering the temperature of the lens in the range from 10 to 15 degree Celsius, and it depends on the environment and the structure of the projector. The invention can effectively solve thermal drift.

Those skilled in the art will readily observe that numerous modifications and alterations of the device and method may be made while retaining the teachings of the invention.

What is claimed is:

1. A projector comprising:
   an optical module comprising a first connecting portion with an opening;
   a lens comprising a first lens group and a second lens group, the first lens group comprising a second connecting portion and a third connecting portion, the second lens group comprising a fixing portion and a protrusion portion, the protrusion portion protruding from the fixing portion, and the fixing portion being fixed to the third connecting portion; and
   a ring-shaped heat conducting member comprising a hole;
   wherein the protrusion portion of the second lens group is inserted into the hole of the ring-shaped heat conducting member such that the ring-shaped heat conducting member is disposed on the fixing portion and that the second lens group is disposed between the first lens group and the ring-shaped heat conducting member, the protrusion portion is then inserted into the opening of the optical module, the second connecting portion is connected to the first connecting portion, and the ring-shaped heat conducting member is disposed between the optical module and the lens and contacts the first connecting portion of the optical module, for conducting heat from the lens to the optical module.

2. The projector of claim 1, wherein a gap is between the first connecting portion and the second connecting portion, and a thickness of the ring-shaped heat conducting member is greater than or equal to a width of the gap.

3. The projector of claim 1, wherein an area of the ring-shaped heat conducting member is greater than or equal to an area of the fixing portion.

4. The projector of claim 1, wherein a body of the first lens group is made of plastic, a body of the second lens group is made of metal and the ring-shaped heat conducting member is used for conducting heat from the second lens group to the optical module.

5. The projector of claim 1, wherein the ring-shaped heat conducting member is a thermal pad.

6. The projector of claim 1, wherein the optical module comprises a body and a heat sink disposed on the body.

7. The projector of claim 1, further comprising a fan, disposed near the optical module, for cooling the optical module.

* * * * *